United States Patent [19]

Kawade et al.

[11] Patent Number: 4,640,990

[45] Date of Patent: Feb. 3, 1987

[54] TELEPHONE ANSWERING APPARATUS HAVING TWO INTEGRATORS OF DIFFERENT TIME CONSTANTS

[75] Inventors: Hideji Kawade, Yamato; Hideaki Takahashi; Yoshiyuki Sato, both of Yokohama; Yuji Urayama, Maebashi, all of Japan

[73] Assignees: Tamura Electric Works Ltd., Tokyo; Victor Company of Japan Limited, Yokohama, both of Japan

[21] Appl. No.: 566,461

[22] Filed: Dec. 28, 1983

[30] Foreign Application Priority Data

Dec. 28, 1982 [JP] Japan ................................. 57-230389

[51] Int. Cl.$^4$ ............................................ H04M 1/64
[52] U.S. Cl. ........................................ 379/77; 379/79; 379/105
[58] Field of Search .................... 179/6.11, 6.07, 6.13, 179/6.14, 6.02, 2 A

[56] References Cited

U.S. PATENT DOCUMENTS

| | | | |
|---|---|---|---|
| 3,715,518 | 2/1973 | Campbell et al. | 179/6.11 |
| 4,024,348 | 5/1977 | Simizu | 179/6.11 |
| 4,192,971 | 3/1980 | Morigami et al. | 179/6.11 |
| 4,196,311 | 4/1980 | Hoven | 179/6.11 |
| 4,203,007 | 5/1980 | Hatori et al. | 179/6.07 |
| 4,296,277 | 10/1981 | Daneffel | 179/6.14 |
| 4,405,833 | 9/1983 | Cave et al. | 179/6.02 |

FOREIGN PATENT DOCUMENTS

| | | |
|---|---|---|
| 2429950 | 1/1975 | Fed. Rep. of Germany . |
| 2939983 | 4/1980 | Fed. Rep. of Germany . |
| 3118812 | 2/1982 | Fed. Rep. of Germany . |
| 1569270 | 6/1980 | United Kingdom . |

*Primary Examiner*—Raymond F. Cardillo
*Assistant Examiner*—Robert A. Weinhardt
*Attorney, Agent, or Firm*—Pollock, VandeSande & Priddy

[57] ABSTRACT

A telephone answering apparatus comprises a mechanical filter through which a received tone burst command signal is applied to a first integrator having a large time constant value for integrating the output signal of the mechanical filter to generate a continuous output signal during the reception of tone bursts. A second integrator having a small time constant value integrates the received command signal to generate an output signal having an envelope substantially identical to the envelope of the tone bursts. A coincidence gate is provided to generate a coincidence output when there is a match between the output signals of the first and second integrators.

11 Claims, 7 Drawing Figures

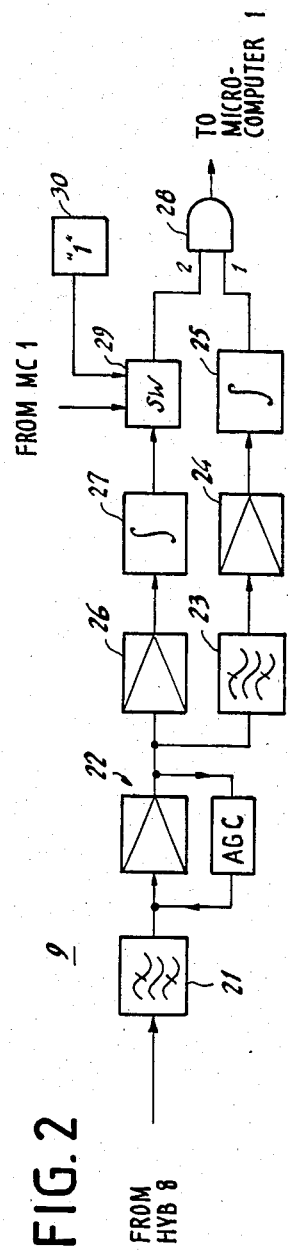
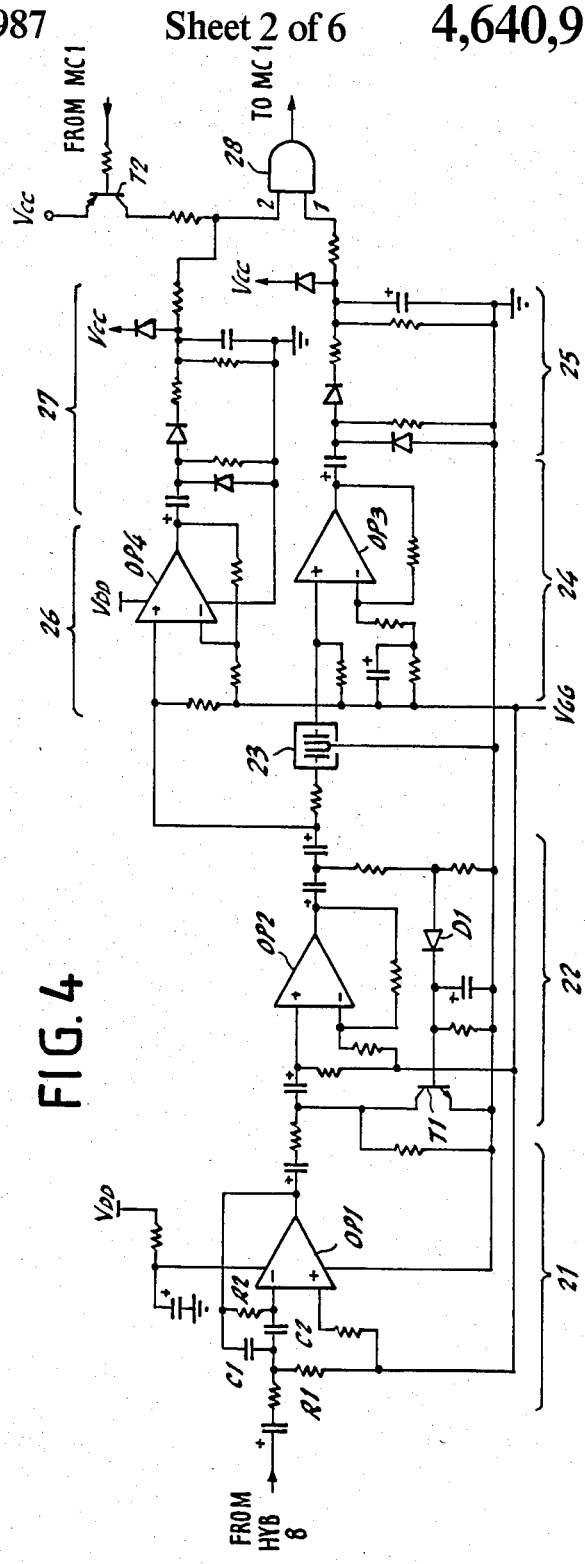
FIG. 2
FIG. 4

TELEPHONE ANSWERING APPARATUS HAVING TWO INTEGRATORS OF DIFFERENT TIME CONSTANTS

BACKGROUND OF THE INVENTION

The present invention relates to a command detector of a telephone answering apparatus which enables the telephone subscriber to control the answering apparatus from a remote location in a desired mode.

Telephone answering apparatus developed in the early period of the history of telephone answering art were provided with a tape recorder having a prerecorded message which is played back in response to the reception of a call to advise the calling party of the fact that the called party is absent. In the next stage of development, the answering apparatus was provided with an added feature that allows the user to record messages of callers while he is absent and to playback the recorded messages later. The most recent version of the telephone answering apparatus includes a remote control feature that allows the owner to access to the answering apparatus from a remote location to playback recorded caller's messages or erase unnecessary ones.

The remote control operation involves sending a signal of a particular frequency from a portable device carried by the owner of the telephone answering apparatus into the transmitter of a remote telephone. The command signal is transmitted in the form of a tone burst and includes a remote ready signal having a duration of 2 seconds followed by a start bit of a 0.8-second duration, and mode-select signals to effect rewind and erase. The mode-select code comprises a series of binary "1"s and "0"s of a 50-ms duration of tone burst. The telephone answering apparatus is provided with a command detector which includes plural filters to discriminate between received mode select codes.

It is desirable to provide as many channels of different frequencies to different groups of users to avoid interference between telephone lines. The answering apparatus is thus designed to meet the required sharp frequency selectivity. Although the high selectivity may be achieved by the use of plural mechanical filters of a high Q value connected in successive stages, this adds to the cost of the apparatus. Another shortcoming inherent in the mechanical filter resides in the fact that it has a delay response which makes it difficult to quickly follow the high repetition rate of the tone bursts of the command signal.

SUMMARY OF THE INVENTION

Accordingly, an object of the present invention is to provide a telephone answering apparatus which is capable of sharp discrimination of received tone bursts with the use of a single mechanical filter.

This object is achieved by the use of a first integrator having a large time constant value for integrating an output signal from a mechanical filter to generate a continuous output signal during the reception of a series of tone bursts and a second integrator having a small time constant value for integrating the received tone bursts to generate an output signal having an envelope substantially identical to the envelope of said tone bursts. Further provided is a coincidence gate having first and second input terminals respectively coupled to the outputs of the first and second integrators, respectively, for generating a coincidence signal when there is a match between the output signals of the first and second integrators.

Preferably, an automatic gain controlled amplifier is provided having a threshold level below the nominal level of the received tone bursts. The amplifier reduces its gain a predetermined amount when the level of the received signal is above the threshold level, the amplifier having a response time greater than the maximum interval between the tone bursts to retain its reduced gain during such interval to reduce the level of noise.

BRIEF DESCRIPTION OF THE DRAWINGS

The present invention will be described in further detail with reference to the accompanying drawings, in which:

FIG. 2 is a block diagram of the command detector of FIG. 1;

FIG. 4 is an illustration of the detail of the command detector of FIG. 2; and

DETAILED DESCRIPTION

Figure 1:
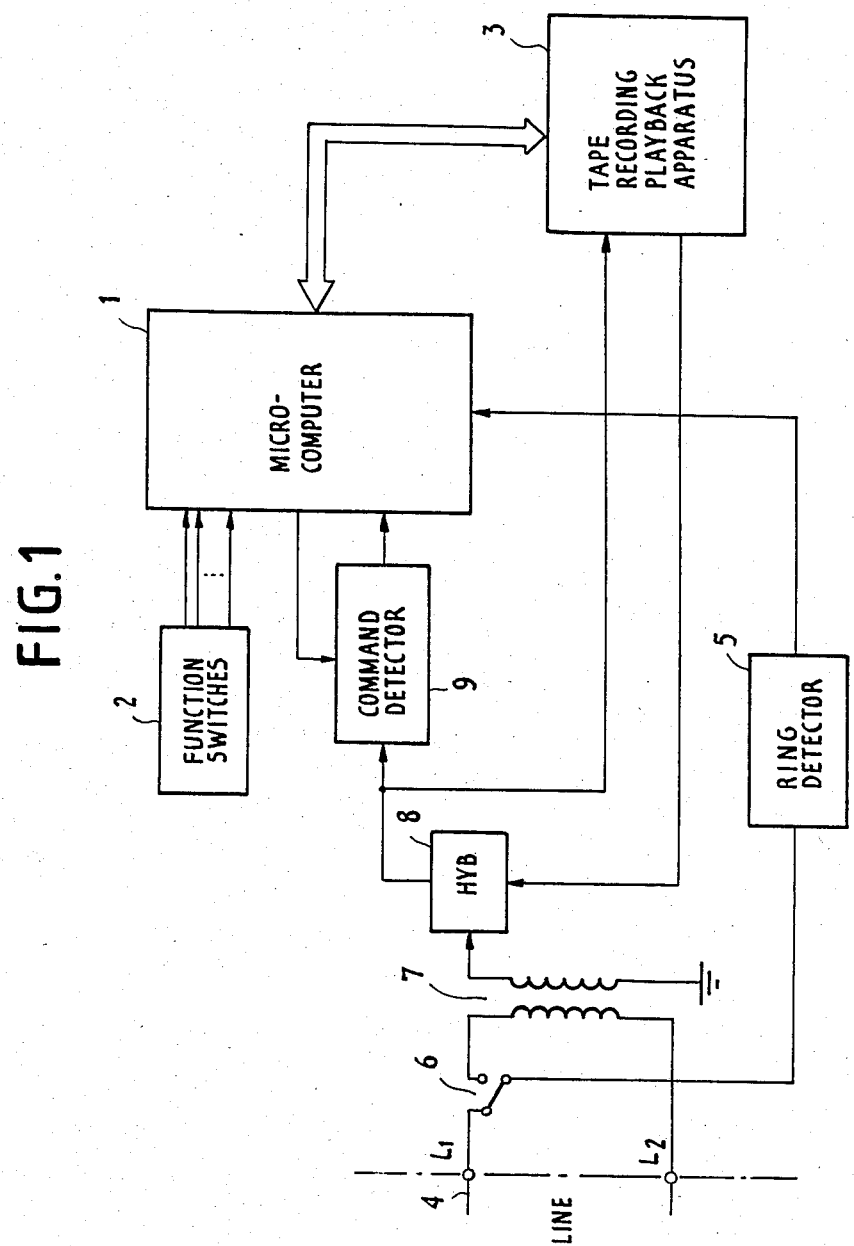
FIG. 1 is a block diagram of the telephone answering apparatus according to the present invention.

Referring now to FIG. 1, a telephone answering apparatus according to the present invention is schematically illustrated as being connected to a telephone line 4 to which the customer's telephone set is usually coupled. The apparatus comprises a microcomputer 1 responsive to signals from manually operated function keys 2 to control a tape recording playback apparatus 3 to receive command signals as well as incoming message signals from or send outgoing message signals to the telephone line 4. A ring detector 5 is coupled through normally closed contacts 6 of a relay included in the detector 5 to a terminal $L_1$ of the telephone line 4 to detect ringing signals transmitted from the telephone exchange when a call is received. When a ringing signal is detected, the ring detector 5 notifies the microcomputer 1 that the apparatus is being called to initiate an answering operation, while at the same time operating the above noted relay to complete a loop through the primary winding of the transformer 7 to trip the ringing circuit of the customer line at the telephone exchange.

The secondary winding of the transformer 7 is coupled to a known hybrid circuit 8 which establishes a first transmission path from the transformer 7 to a command detector 9 of the present invention as well as to the recording head of the apparatus 3 and a second transmission path from the playback head of the apparatus 3 to the transformer 7.

The signals transmitted from the telephone line include messages of callers and a tone burst command signal sent from a portable device carried by the telephone subscriber to replay recorded callers' messages. The callers' messages are fed to the recording head of the apparatus 3 to be recorded on a tape and the subscriber's command signal is fed to the command detector 9 which relays the command signal to the microcomputer 1.

On the tape is prerecorded the subscriber's message which is initially reproduced when a call is answered to allow the caller to record his or her message and on command from the subscriber's portable device caller's messsages are reproduced. In the specification, the prerecorded subscriber's message is termed "outgoing message" and the recorded callers' messages are termed "incoming messages".

The detail of the command detector 9 is shown in FIG. 2. Numeral 21 indicates a conventional band-pass filter which receives the tone burst command signal via the hybrid circuit 8 to permit discrimination of the frequency of the tone burst assigned to the subscriber from other tone burst signals. More specifically, the frequency spectrum of command signals assigned to subscribers ranges from 1.5 kHz to 2.4 kHz and is divided into 10 channels with a separation of 100 Hz. The band-pass filter 21 has a passband which encompasses one of low, medium and high frequency ranges of the 1.5–2.4 kHz spectrum. The tone burst signal passing through the band-pass filter 21 is applied through an automatic gain controlled amplifier 22 to a mechanical filter 23 having a passband of 1.5 kHz±50 Hz, for example. The mechanical filter 23 applies the output of the gain-controlled signal through a linear amplifier 24 to a first integrator 25.

Figure 3:
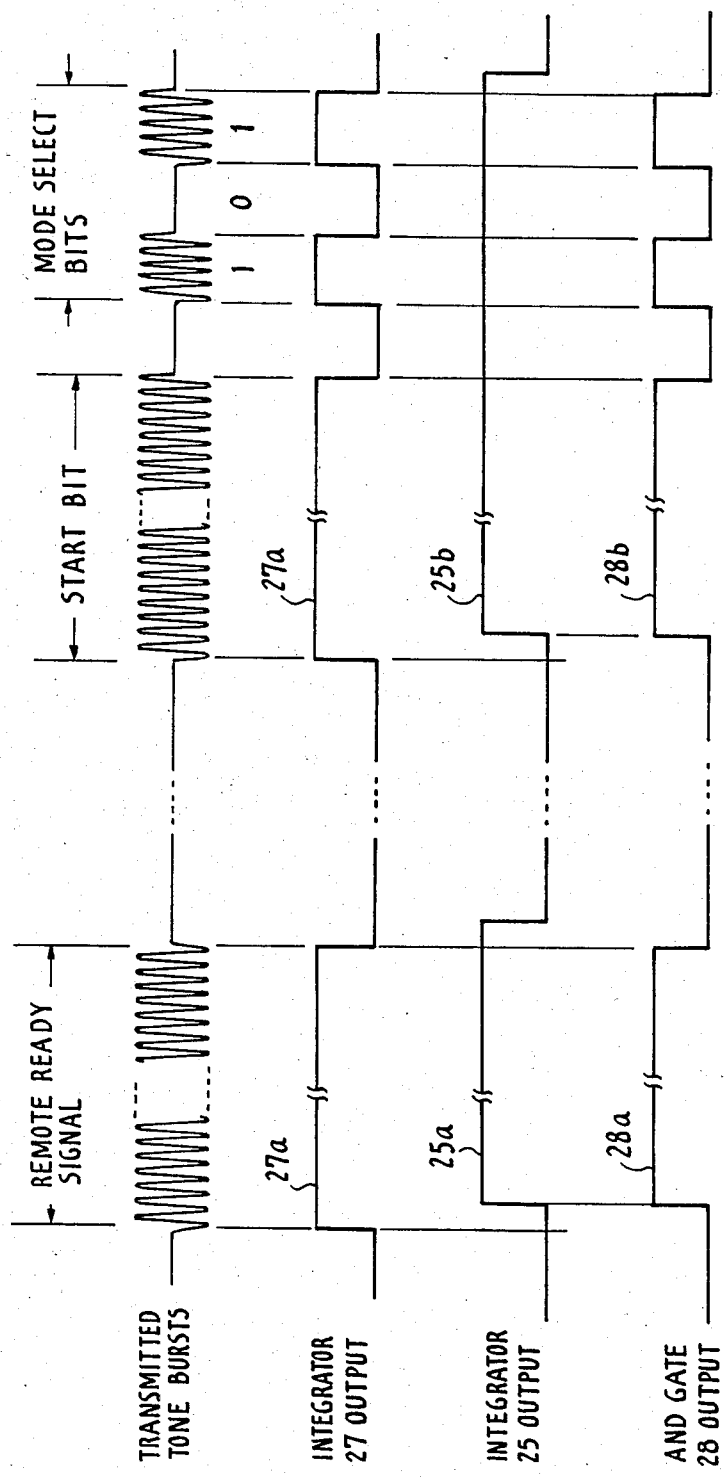
FIG. 3 is a timing diagram of a command signal transmitted from a remote station to the telephone answering apparatus.

The command signal comprises a remote ready burst pulse of a typically 2-second duration, a start burst pulse of 1-second duration and a mode select code comprising a series of binary "1"s and "0"s each with a duration of 50 milliseconds, as illustrated in FIG. 3.

The time constant value of the first integrator 25 is chosen so that it remains at a high output level even when two successive tone bursts are spaced apart by the maximum of 150 milliseconds. Due to the combined effect of the large time constant value with the fact that the input signal to the first integrator 25 has passed through two filters at 21 and 23, the first integrator 25 produces a continuous output as shown in FIG. 3 having leading and trailing edges which occur at times slightly delayed from the times of occurrence of the leading and trailing edges of the tone burst sequence, respectively. The high level output of the first integrator 25 thus verifies that a command signal is being correctly received. The first integrator output is coupled to the first input of an AND gate 28 as an enabling signal.

To permit sharp discrimination of the individual tone burst pulses of the mode select code, the output signal of the automatic gain controlled amplifier 22 is further applied through a linear amplifier 26 to a second integrator 27 having a smaller time constant value than that of the first integrator 25. The time constant value of the integrator 27 is chosen so that it responds quickly to the fast rise and fall times of the individual pulses of each tone burst. Due to the combined effect of the small time constant value with the fact that the input signal to the second integrator 27 has passed through only one filter at 21, this integrator provides an output as shown in FIG. 3 having a waveform closely following the transitions of the received tone burst pulses. The output of the second integrator 27 is applied through a switch 29 to the second input of the AND gate 28 which generates an output as shown in, FIG. 3.

It is seen therefore that if the frequency of a received command signal slightly deviates from the passband frequency of mechanical filter 23, the output of first integrator 25 goes low and thus no signal appears at the output of AND gate 28. The AND gate 28 thus functions to verify that the discriminated burst pulses occur at the assigned frequency. The output of the AND gate 28 is connected to the microcomputer 1 which decodes the information contained in the command signal to execute the instructions programmed in the memory thereof.

The present invention provides an advantage in that it allows sharp discrimination of burst pulses by the use of a single mechanical filter.

The automatic gain controlled amplifier 22 has the effect of preventing the command detector 9 from interpreting noise as a tone burst during low-level intervals between successive burst pulses when the command signal is of relatively lower amplitude than the noise. Furthermore, since the second integrator 27 is responsive to tone bursts of a fairly wide range of frequencies as determined by the passband of the filter 21, this integrator is apt to pick up noise, generating a high-level output during such low-level intervals.

The automatic gain controlled amplifier 22 has a predetermined threshold level which is below the nominal level of the command signal and reduces its gain when its output is above the threshold level. The amplifier 22 thus suppresses the command signal since it is usually higher than the threshold. However, the suppression continues during low-level intervals due to the relatively large response time of the amplifier 22 and the noise that occurs during such intervals is suppressed to a level insufficient for the second integrator 27 to generate a significant output signal.

However, if the recorded message signal is sent to the telephone line simultaneously with the reception of a tone-burst signal such as remote ready or start signal through a lossy subscriber circuit, the message signal will find a leakage path through the hybrid circuit 8 to band-pass filter 21 to which the attenuated tone-burst signal is also applied. Due to the higher level, the message signal is dominant and suppresses the gain of AGC amplifier 22. Since the AGC amplifier 22 has an inherent recovery time it takes to recover from the suppressed state to normal upon the termination of a high level input signal, the termination of the message signal will briefly cause a voltage drop at the output of amplifier 22. Because of having a smaller time constant value than integrator 25, integrator 27 will respond to such voltage drop by causing its output to drop during the recovery time and, hence, the output of AND gate 28 goes low briefly during the reception of a continuous tone signal. This results in a different command signal at the output of AND gate 28 than what is intended.

To prevent this problem, microcomputer 1 turns on switch 29 to forcibly apply a logical "1" to one input of AND gate 28 from a voltage source 30 upon detection of the initiation of a remote ready or start signal for a predetermined period to ignore the output of integrator 27. If the coincidence output exists during the predetermined period, the command circuit 9 regards the received signal as a valid control signal.

The detail of the command detector 9 is illustrated in FIG. 4. The band-pass filter 21 is shown as comprising an operational amplifier OP1 and resistors R1, R2 and capacitors C1 and C2 which determine the passband of the filter. The automatic gain controlled amplifier 22 comprises an operational amplifier OP2 and a gain control circuit including a diode D1 coupling the output of amplifier OP2 to an RC network and a transistor T1 which is biased by the voltage developed in the RC network to establish a low impedance path to the input of amplifier OP2. Amplifiers 24 and 26 comprise operational amplifiers OP3 and OP4. The switch 29 comprises a transistor T2 having a base coupled to be responsive to a control signal from the microcomputer 1 to apply a logical "1" potential to the second input of AND gate 28 from a voltage source Vcc through the collector-emitter path of the transistor T2.

Figure 5A:
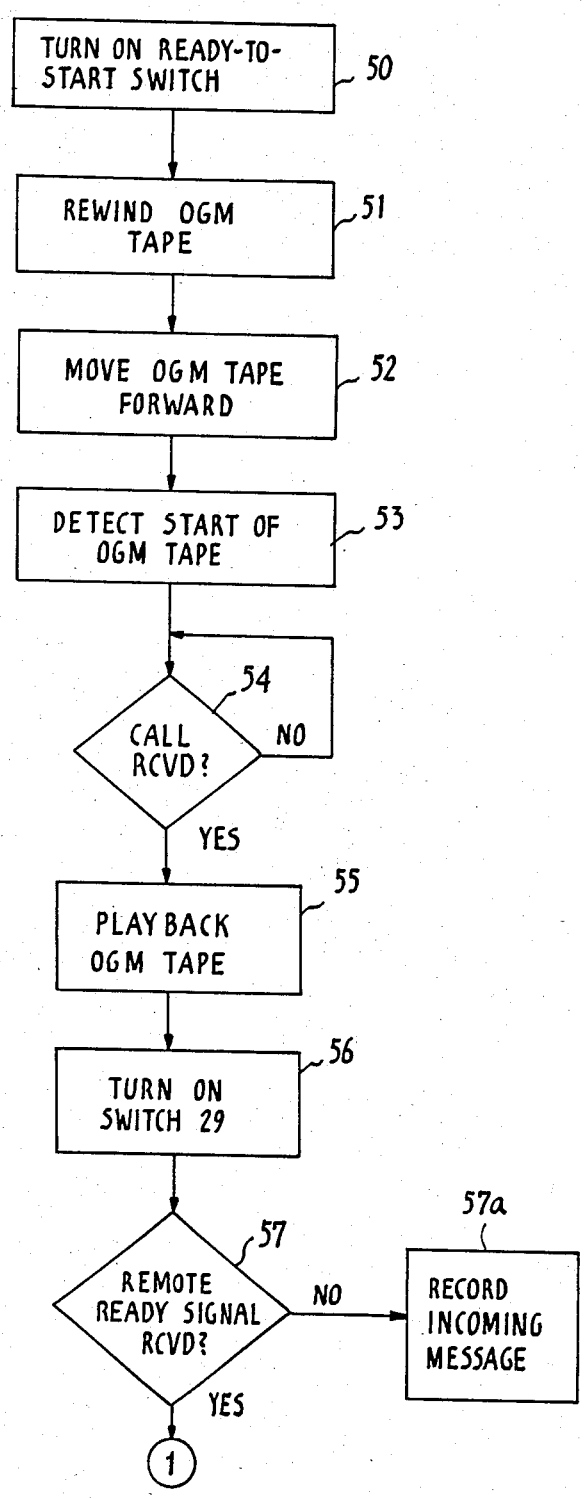
FIGS. 5a–5c are illustrations of a flowchart describing the instructions performed by the microcomputer of FIG. 1.
Figure 5B:
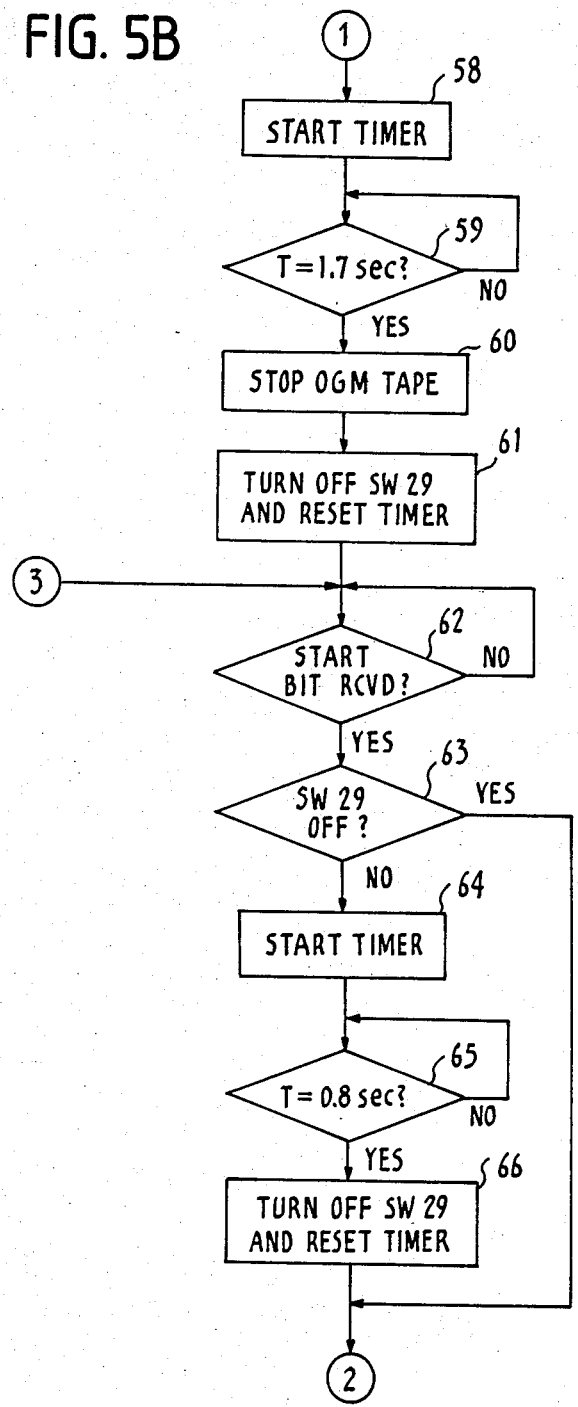
Figure 5C:
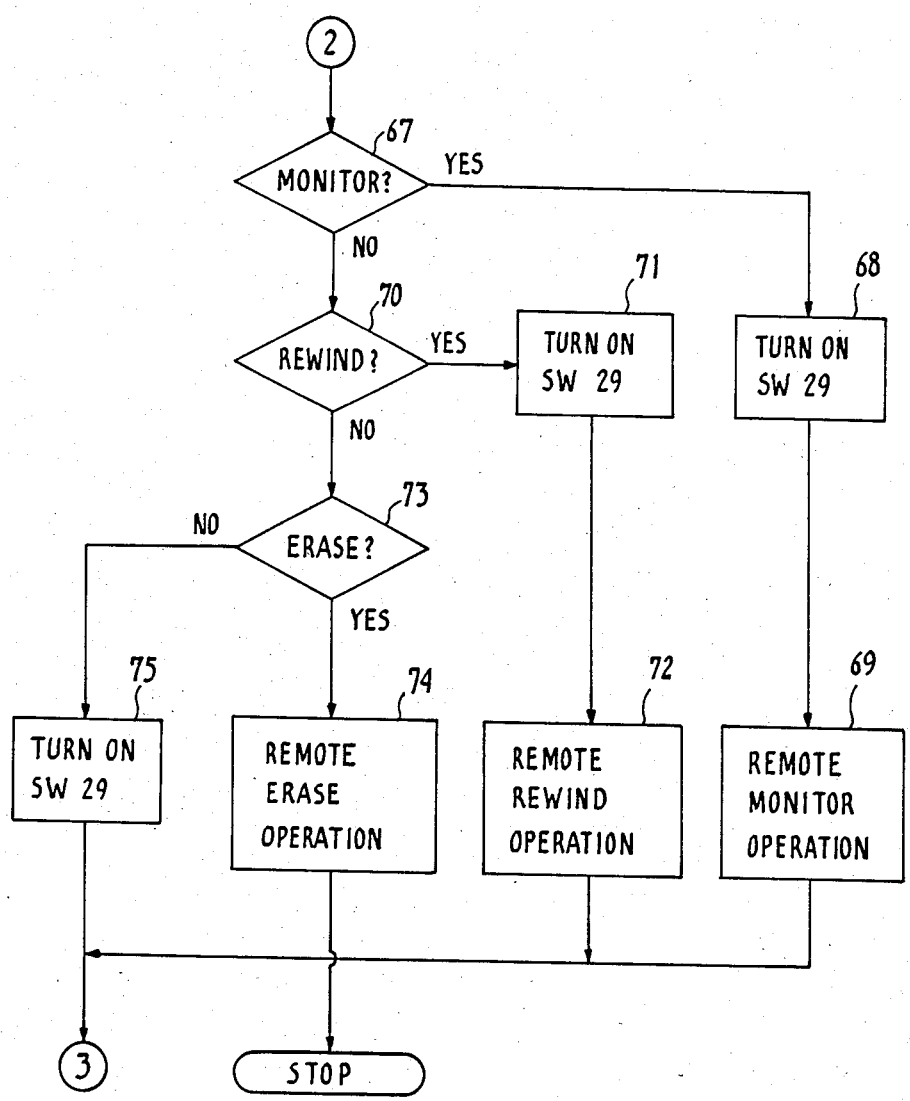

FIGS. 5A to 5C show a flow diagram describing the instructions to be executed by the microcomputer 1 relating to the operation of the command detector 9.

With a Ready-to-Start function switch being operated at Step 50, an outgoing message (OGM) tape in which the subscriber's message is recorded is rewound at Step 51. In Step 52, the OGM tape is transported in the playback direction to detect the beginning of the prerecorded message at Step 53. When a call is received at Step 54, the OGM tape is played back at Step 55 and the microcomputer 1 turns on switch 29 at Step 56, so that a logical "1" is placed on the second input of the AND gate 28. If the call has been placed by the subscriber himself and a remote ready tone burst is transmitted from his portable transmitter, the microcomputer 1 detects the reception of this tone burst at Step 57 and goes to a Step 58. If no remote ready signal is received, a Step 57a is executed to proceed with the usual telephone answering operation in which the caller's message is recorded after the transmission of the outgoing message.

In the Step 58, a timer is initiated to count clock pulses to measure the elapse of time from the time of reception of the remote ready signal. At Step 59 the microcomputer checks if the measured time has reached a predetermined value which is shorter than the 2-second period of the remote ready signal, typically 1.7 seconds. At the end of this period, the OGM tape is stopped at Step 60 and the switch 29 is turned off at Step 61 to reapply the output of the second integrator 27 to the AND gate 28 and the timer is reset. Therefore, the second input of AND gate 28 is forcibly driven to logical "1" to safeguard the reception of the remote ready signal from the message signal which is sent simultaneously from the telephone answering apparatus to the telephone subscriber. The reception of a start bit is checked at Step 62. Control then is exited to decision step 63 which tests to see if the switch 29 is turned off. If the answer is positive, control exits to decision step 67; and if it is negative, exit is to operations step 64 which directs the starting of the timer again. The first reception of the start bit immediately following the remote ready signal causes control to proceed through steps 62 and 63 and through steps 67, 70 and 73 to operations step 75 which directs the operation of switch 29. Exit from step 75 is to decision step 62. If the start bit is received, control advances through step 63 to operations step 64 which directs the starting of the timer again. In decision step 65 the microcomputer checks if the timer count has reached 0.8 second which is slightly smaller than the 1-second start bit. Control goes to Step 66 to turn off the switch 29 to reapply the output of integrator 27 to AND gate 28 if the decision at step 65 is positive. Therefore, the second input of the AND gate 28 is forcibly driven to a logical "1" level for the period of the start bit to cause the output of the AND gate 28 to remain at logical "1" level to prevent the message signal from interfering with the start bit noise. With the turn-off of switch 29, the command detector 9 is now ready to receive a mode select code that follows.

Various modes are available for the subscriber by sending a different combination of three binary "1"s and "0"s. For example, a code "101" is assigned to "Monitor" mode which allows the subscriber to replay the tape in which the sound of a particular room of the subscriber's house is continuously recorded while the user is out of her home to allow her to monitor any noise or a baby's voice. A code "100" is assigned to "REWIND" mode which allows the subscriber to rewind an incoming message (ICM) tape to receive callers' messages from remote location, and a code "001" is assigned to "ERASE" mode by which the recorded incoming messages are erased.

At Step 67, the microcomputer 1 interprets the received 3-bit mode select code by checking it against each of the stored codes and if it detects a code "101" indicating that a "monitor" mode is requested, the microcomputer proceeds to a Step 68 to turn on the switch 29 again to protect the circuit 9 against noise once the mode select code is discriminated. Control goes to a Step 69 to rewind the monitor tape and returns to step 62.

If the received mode select code is "100" indicating that "REWIND" mode is requested, control exits from the Step 67 to a Step 70 and then to a Step 71 to turn on the switch 29 and proceeds to a Step 72 to rewind the incoming message tape and returns to step 62.

If the received mode select code is "001" indicating that "ERASE" mode is requested, control exits from Step 70 to a Step 73 and then to a Step 74 to erase the recorded callers' messages. If the received mode select code fails to match any of the stored codes, control returns to the Step 62 to repeat the above process.

What is claimed is:

1. A circuit for discriminating a command signal for operating a telephone answering apparatus adapted to be connected to a telephone line to transmit therethrough a recorded message to a calling station and to receive said command signal therefrom, said command signal including a series of tone bursts of a varying number signifying a particular operating mode of said apparatus, the discrimination circuit comprising:
    a mechanical filter for passing components having the frequency of said received command signal;
    a first integrator working cooperatively with said mechanical filter and responsive to the output thereof, said first integrator having a large time constant value for integrating said components passing through said mechanical filter to generate a continuous output signal during the reception of said tone bursts;
    a second integrator having a small time constant value for integrating said received command signal to generate an output signal having an envelope substantially identical to the envelope of said tone bursts; and
    a coincidence gate having first and second input terminals respectively coupled to the outputs of said first and second integrators for generating a coincidence signal when there is a match between the output signals of said first and second integrators.

2. A circuit as claimed in claim 1, further comprising automatic gain controlled amplifier means through which said received command signal is applied as a common input signal to said mechanical filter and to said second integrator.

3. A circuit as claimed in claim 2, wherein said automatic gain controlled amplifier means has a threshold level below the nominal level of said received command signal, said automatic gain controlled amplifier reducing its gain a predetermined amount when the level of the received signal is above said threshold level, said amplifier having a response time greater than the maximum interval between said tone bursts to retain its reduced gain during said interval.

4. A circuit as claimed in claim 1, wherein said tone bursts are preceded by a ready signal, further comprising means for applying a potential having an identical level to the output signal of said second integrator to said second input terminal of said coincidence gate for a period substantially equal to the period of said ready signal in response to said recorded message being transmitted.

5. A circuit as claimed in claim 4, wherein said ready signal is followed by a start signal, wherein said applying means includes means to reapply said potential to said second input terminal of said coincidence gate for a period substantially equal to the period of said start signal in response to receipt of said start signal.

6. A circuit as claimed in claim 1, further comprising a band-pass filter through which said received command signal is applied as a common input signal to said mechanical filter and to said second integrator, said band-pass filter having a passband greater than a passband of said mechanical filter.

7. A circuit as claimed in claim 2, further comprising a band-pass filter through which said received command signal is applied to said automatic gain controlled amplifier, said band-pass filter having a passband greater than a passband of said mechanical filter.

8. A circuit as claimed in claim 1, wherein said command signal includes a control signal of a continuous tone burst signal, further comprising:

means for detecting initiation of said control signal, the detecting means detecting the output of said first integrator by ignoring the output of said second integrator for a predetermined length of time which runs from the time the initiation of the control signal is detected, the detected output of said first integrator being a valid indication of the reception of said control signal if said detected first integrator output exists during said predetermined length of time.

9. A circuit as claimed in claim 8, further comprising automatic gain controlled amplifier means through which said received command signal is applied to said mechanical filter and said second integrator as a common input signal.

10. A circuit as claimed in claim 9, wherein said automatic gain controlled amplifier means has a threshold level below a normal level of said received command signal, said automatic gain controlled amplifier reducing its gain a predetermined amount when the level of the received command signal is above said threshold level, said amplifier means having a response time greater than a maximum interval between said tone bursts to retain its reduced gain during said interval.

11. A circuit as claimed in claim 9, further comprising a band-pass filter for passing components having frequencies in a range greater than the frequencies of said components passing through said mechanical filter, said components passing through said band-pass filter being applied as a common input to said mechanical filter and said second integrator.

* * * * *